Aug. 18, 1953  E. WILDHABER  2,648,894
CUTTER FOR PRODUCING GEARS
Filed Aug. 20, 1947  3 Sheets-Sheet 1
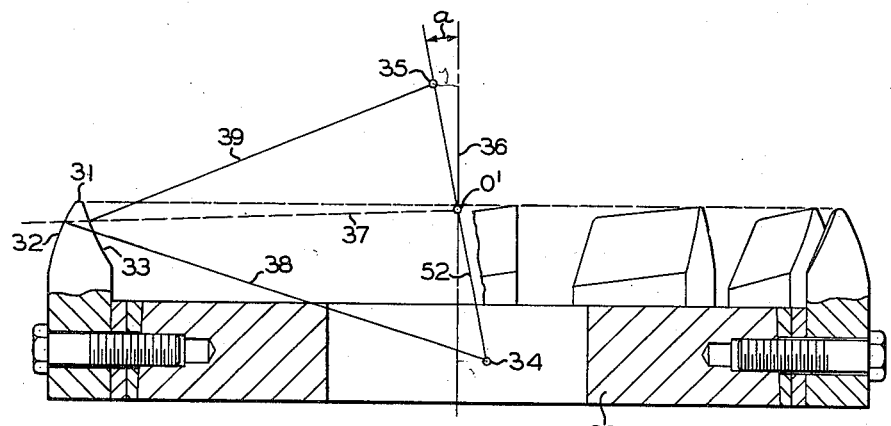
FIG. 1
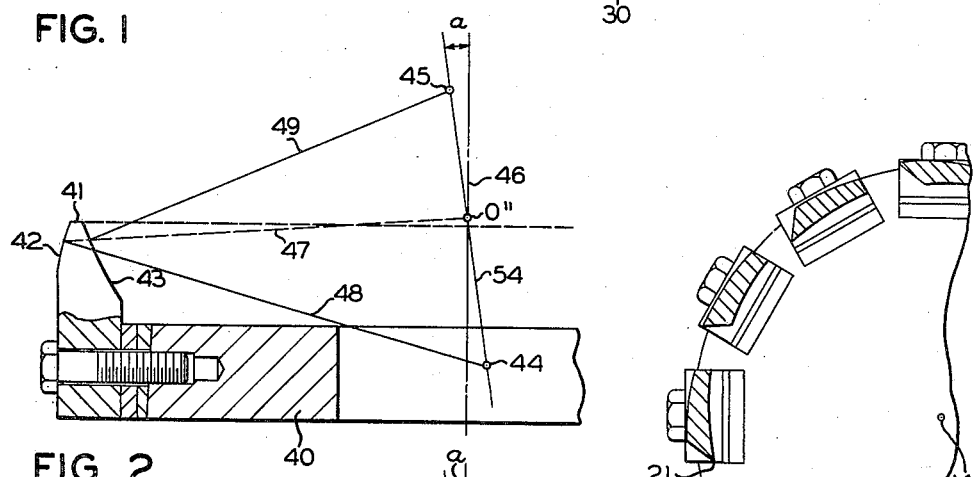
FIG. 2
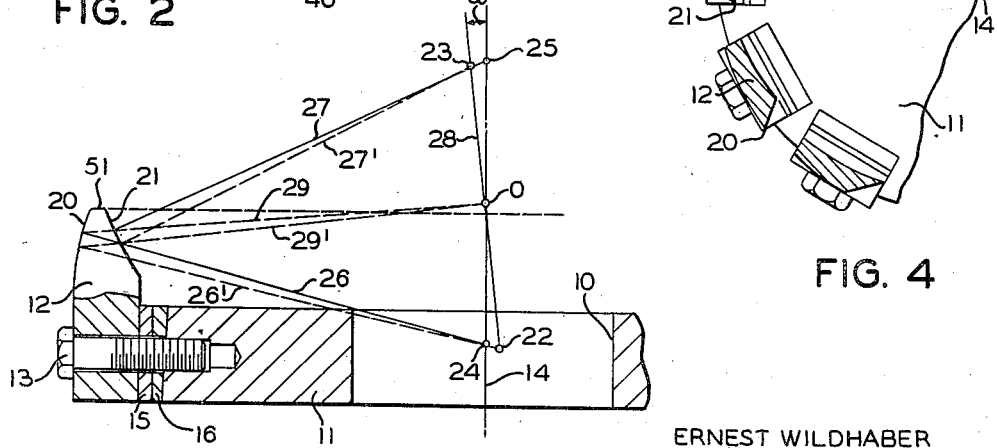
FIG. 3
FIG. 4
ERNEST WILDHABER
Inventor
By
Attorney Aug. 18, 1953     E. WILDHABER     2,648,894
CUTTER FOR PRODUCING GEARS
Filed Aug. 20, 1947     3 Sheets-Sheet 2

ERNEST WILDHABER
Inventor

Attorney

Aug. 18, 1953          E. WILDHABER          2,648,894
                    CUTTER FOR PRODUCING GEARS
Filed Aug. 20, 1947                        3 Sheets-Sheet 3

ERNEST WILDHABER
Inventor

By *B. E. Shleninger*
Attorney

Patented Aug. 18, 1953

2,648,894

UNITED STATES PATENT OFFICE 2,648,894

CUTTER FOR PRODUCING GEARS

Ernest Wildhaber, Brighton, N. Y., assignor to Gleason Works, Rochester, N. Y., a corporation of New York Application August 20, 1947, Serial No. 769,725

6 Claims. (Cl. 29—105)

The present invention relates to tools for and to a method of cutting gears, and more especially to tools for and a method of cutting longitudinally curved tooth gears, such as spiral bevel and hypoid gears.

Because of advantages in machine construction, when both members of a pair of spiral bevel or hypoid gears are to be generated, it is conventional practice to generate the gears conjugate to nominal crown gears (gears having plane top surfaces and a pitch cone angle of somewhat less than ninety degrees). Where face-mill cutters having straight side-cutting edges are employed as the cutting tools, as is conventional practice, this presents the problem of eliminating bias bearing in the mating gears. The pinion has to be cut one side at a time with its position shifted between cuts, or some special generating motion entailing a special machine is required.

Moreover, whether both members of the pair are generated, or one is form-cut and the mate generated conjugate thereto, cutters having side-cutting edges differently inclined to the cutter axis have been required for cutting gears of different spiral or different dedendum angles. Furthermore, to obtain the localization of lengthwise tooth bearing that is required to enable the gears to accommodate themselves to the variations in loads and mountings that are encountered in use, the mating tooth surfaces of gear and pinion have to be cut with different radii of lengthwise tooth curvature, which has heretofore ordinarily meant that for this additional reason different cutters have had to be employed in cutting gear and pinion; and in practice it has ordinarily meant, moreover, that while both sides of a tooth space of the gear might be cut simultaneously, only one side of a tooth of the pinion could be cut at a time.

While these various requirements are not of any particular disadvantage where gears of a particular size, with specific spiral and dedendum angles are to be produced in quantity, the large investment in cutters required and the various problems in production, that have to be met, have discouraged the small shops, which are required to cut gears of a wide variety of sizes, and of spiral and dedendum angles, in small lots, from going into the production of spiral bevel and hypoid gears.

Various efforts have been made in the past to devise satisfactory and practical methods for cutting spiral bevel and hypoid gears in small job lots where the number of cutters required to cut a range of gears would not be too great.

One drawback of such so-called jobbing systems as have heretofore been proposed, however, is that they were only suited to small-lot work. If it became necessary to cut a particular pair of gears in quantity, usually the small-lot system was no longer practical, and new cutters had to be procured and a different method of cutting employed.

With such methods as have heretofore been used, moreover, for cutting spiral bevel and hypoid gears whether in production lots or small quantities, it has been the practice to cut the pinion or smaller member of the gear pair one tooth side at a time to secure the desired localization of tooth bearing; and different cutters have been required for cutting gear and pinion. Methods are known whereby two tooth surfaces of a gear and pinion may be cut at a time, but these require use of special motions or result either in gears of somewhat inferior quality or require separate cutters for gear and pinion. Furthermore, unless special motions are employed, such methods do not always lend themselves to the production of gear pairs having localized lengthwise tooth bearing or contact on mating tooth surfaces.

Where the gears to be produced are pairs in which one member is form-cut and the other generated, conventional methods require a different cutter for the pinion from that used in cutting the gear, for the additional reason that either a female cutter is required on the pinion if a male cutter is used on the gear and both members are to have two tooth sides cut simultaneously, or the included angle between opposite side-cutting edges of the pinion cutter must be smaller than such included angle for the gear cutter if male cutters are to be used in cutting both members.

A primary object of the invention is to provide cutters for cutting longitudinally curved tooth gears which will permit the use of a simplified system of tools so that, with a relatively small number of face-mill cutters, gears of a wide range of tooth numbers, face-widths, pitches, and spiral angles may be cut.

Another object of the invention is to provide cutters for cutting longitudinally curved tooth tapered gears with which both members of a gear pair may have opposite sides of each tooth space cut simultaneously without bias bearing.

A further object of the invention is to provide cutters for cutting longitudinally curved tooth gears with which both members of a gear pair may have opposite sides of each tooth space cut simultaneously, yet have localized lengthwise tooth bearing or contact on their mating tooth surfaces.

A further object of the invention is to provide cutters for cutting longitudinally curved tooth gears with which two side tooth surfaces of both of the mating gears may be cut simultaneously with the same tool and yet the mating tooth surfaces will have localization of profile tooth bearing, that is, mating tooth surfaces will be relieved at tops and bottoms of the tooth profiles to have less than full length tooth contact.

A still further object of the invention is to provide cutters for cutting longitudinally curved tooth gears with which the two sides of a tooth space may be cut simultaneously in both members of a gear pair with the same tool and yet localized tooth bearing both lengthwise and profile-wise may be obtained on the mating tooth surfaces.

A further object of the invention is to provide cutters for cutting longitudinally curved tooth gears with which the same face-mill cutter may be used in cutting both members of a gear pair.

Still another object of the invention is to provide cutters for cutting longitudinally curved tooth gears with which the same face-mill cutter may be used in cutting various gears regardless of their spiral or dedendum angles.

A further object of the invention is to provide cutters for cutting longitudinally curved tooth gears with which the same cutter may be used for cutting both members of a gear pair and yet both sides of each tooth space of both members of the pair may be cut simultaneously, not only in cases where both gears are generated but also where one gear is form-cut and the other generated.

Other objects of the invention will be apparent hereinafter from the specification and from the recital of the appended claims.

In the drawings:

Fig. 1 is an axial sectional view of a face-mill cutter made according to one embodiment of this invention and constituting one member of a set of cutters that may be employed for cutting a whole range of gears, and showing certain features of construction of this cutter;

Fig. 2 is a fragmentary axial sectional view of another cutter of the set, and illustrating diagrammatically its structure and proportions;

Fig. 3 is a similar view illustrating still another cutter of the set and showing further diagrammatically the structure of this cutter and certain features on which the invention is based;

Fig. 4 is a fragmentary sectional view taken at right angles to the axis of the cutter of Fig. 3 and illustrating one way in which it may be made;

Figure 5:
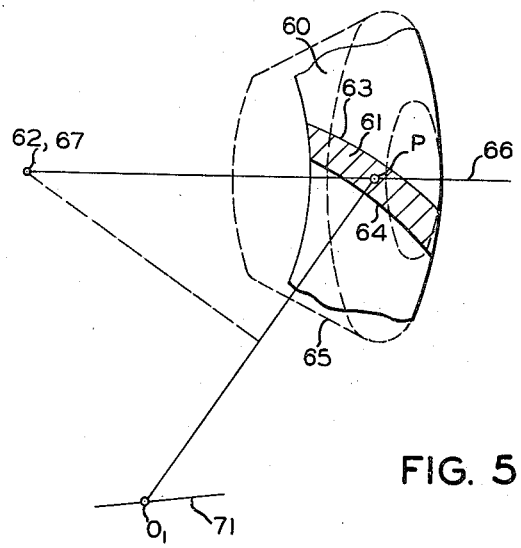
Fig. 5 is a diagrammatic view illustrating certain relationships between the work and the cutter in the generation of the pinion or smaller member of a gear pair according to this invention.

The present invention is based on the use of a novel set of face-mill gear cutters which vary in point-width. These cutters have cutting profiles that are circular arcs and they therefore resemble spherical face-mill cutters. They differ from true spherical cutters, however, in that the centers of curvature of both the outside and the inside cutting surfaces are displaced from, that is, off-set from the axis of the cutter. With these cutters, however, as with spherical cutters, all problems regarding bias bearing are eliminated. Figs. 1 to 3 inclusive show three cutters of a set such as may be employed in this invention.

Referring first to Fig. 3, 10 denotes a face-mill cutter made according to one embodiment of this invention and comprising the head 11 and a plurality of annularly arranged cutting blades 12. The blades 12 may be secured to the cutter head in the usual way by bolts 13 and may be adjusted radially of the axis 14 of the head in the conventional manner by use of shims 15 and wedges 16. In the view of Fig. 3, for the sake of ease in explanation the single blade 12 is shown as having both an outside cutting edge or profile 20 and an inside cutting edge or profile 21. The cutter may be made and sharpened, however, in conventional manner so that alternate blades have opposite side-cutting edges, as shown in Fig. 4.

20 and 21 are the actual cutting edges of the blade or blades if the cutting edges are located in an axial plane of the cutter. They denote the cutting profiles of the cutter if the actual cutting edges are off-set from an axial plane. They are then the profiles of an axial section of the surfaces described by the cutting edges as the cutter rotates on its axis 14.

By "cutting surfaces," then, as used hereinafter are meant the surfaces of revolution described by the cutting edges as they rotate about the cutter axis.

The outside cutting profile 20 is a convex circular arc centered at 22. The inside cutting profile 21 is a concave circular arc centered at 23. It will be noted that both centers 22 and 23 are off-set from cutter axis 14. In a true spherical cutter, the centers of the outside and inside cutting profiles would be on axis 14 and for cutting profiles of the inclinations or pressure angles shown would be at 24 and 25, respectively. It will be seen, then, that the radius of the outside cutting profile 20 of the cutter 10 is larger than the profile radius of a spherical surface of the same inclination, while the inside cutting profile 21 has a smaller radius than a spherical cutting profile of equal inclination. The outside cutting edges of the cutter 10 are, therefore, less convex and will remove, therefore, slightly more stock at the top and bottom of the profile of a gear tooth cut by the cutter, than a cutter having a true spherical outside cutting surface. Likewise, the inside cutting profile of the cutter shown is more concave than would be the inside cutting surface of a true spherical cutter and will remove more stock at the top and bottom of a tooth profile than a true spherical cutting surface. The cutter 10 has, therefore, the ability to produce a tooth shape on the work which may mesh with its mate gear with less than full profile contact.

It is known that some easing off in tooth profile contact may be had in a pair of gears cut with cutters of circular arcuate profile shape by making the cutters so that their centers of curvature are off-set from the cutter axis. The novelty of the cutters of the present invention resides in the positions of the centers 22 and 23 of profile curvature with respect to the cutter axis and in the relative proportions of the cutting profile to the cutter point-widths.

In the cutter 10 shown in Fig. 3, the profile centers 22 and 23 are spaced from cutter axis 14 at distances which are proportional to their respective profile radii 26 and 27. A straight line 28 connecting the centers 22 and 23 is inclined at an angle $a$ to the cutter axis 14 and it intersects the cutter axis at a point O. Distances 22–O and 23–O are also found to be proportional to the radii 26, 27. It will be apparent, then, that any line passing through point O, such as the dotted line 29, will have the same inclination to the cutting profiles 20 and 21. In other words, the pressure angles of the cutting profiles 20 and 21 are equal with reference to a line 29 passing through point O and intersecting these profiles. This is the case because the normal distances of points 22 and 23 from line 29 are proportional to the distances 22–O and 23–O and are therefore proportional to the profile radii 26 and 27. The sine of the pressure angle is equal to the proportion of the distance of the point 22 from line 29 to the radius 26 for the outside cutting profile; and for the inside cutting profile, the sine of the pressure angle is equal to the proportion of the distance 23 from line 29 to the radius 27. The two sines and pressure angles are alike because the two proportions are equal. Any other line passing through O, such as the line 29' is also equally inclined to the two cutting profiles 20 and 21. The practical advantage of this design of cutter will appear hereinafter.

The cutters of Figs. 1 and 2 are similar in structure to the cutter of Fig. 3. They differ, however, from the cutter of Fig. 3 in point-width, that is, in the distance between opposite side-cutting profiles of the cutter at the tip of the cutter. For a cutter, each of whose blades have opposite side-cutting edges, the point-width is the width of a blade at its tip. For a cutter, such as shown in Fig. 4, in which alternate blades have opposite side-cutting edges, the point-width is the distance between opposite side-cutting edges measured across the tips of two successive blades.

The cutter 30 of Fig. 1 has a smaller point-width 31 than the point-width 41 of the cutter 40 of Fig. 2, and the cutter 40 of Fig. 2 has a smaller point-width 41 than the point-width 51 of the cutter 10 of Fig. 3. The cutters 30 and 40 have, however, the characteristic that the centers of their outside and inside cutting profiles are off-set from their axes and the off-sets are in proportion to the radii of the cutting profiles.

Thus, in the cutter 30 of Fig. 1, the outside cutting profile 32 has its center at 34 and the inside cutting profile 33 has its center at 35, and the distances of the two centers 34 and 35 from the cutter axis 36 are in proportion to the radii 38 and 39 of the two cutting surfaces. Furthermore, the two centers 34 and 35 lie on a line 52 which intersects the cutter axis 36 in a point O' which is spaced from centers 34 and 35 in proportion to the radii 38 and 39. Moreover, the cutting profiles 32 and 33 are equally inclined to any line 37 drawn through point O' and intersecting the profiles.

Likewise, the outside cutting profile 42 and the inside cutting profile 43 of cutter 40 have centers 44 and 45, respectively, off-set from the cutter axis 46 distances which are proportionate to the radii 48 and 49 of these profiles. Moreover, the line 54 connecting the centers 44 and 45 intersects the cutter axis 46 in a point O'' which is spaced from centers 44 and 45 distances which are proportionate to the radii 48 and 49, respectively. Furthermore, the outside and inside cutting profiles 42 and 43 are equally inclined to a line 47 which passes through point O''.

It should be noted that the angle $a$ of inclination of the line, 52, 54, or 28, which connects the profile centers, to the cutter axis, 36, 46, or 14, decreases with increasing point-width, and that the point, O', O'', or O, of intersection of this line with the cutter axis is displaced axially forward of the cutter axis with increasing point-width of the cutter. Points O and O'' are beyond the tips of the blades in the cutters of Figs. 2 and 3, while point O' is below the tips of the blades of the cutter of Fig. 1, and the point O is more beyond the tips of the blades of the cutter of Fig. 3 than point O'' is beyond the tips of the blades of the cutter of Fig. 2.

Angle $a$ is a factor related to ease-off or modification of the tooth profile of the gear, which is cut with the cutter, at the top and bottom thereof. With my system of cutters, the profile ease-off at the tooth depth proportional to the cutter point-width is either constant or increases moderately with increasing point-width.

The cutters shown will produce not only tooth surfaces on mating gears which have less than full profile contact, but also tooth surfaces which have less than full length contact. The lengthwise ease-off or localization of tooth bearing is controlled by the radius of lengthwise curvature of the cutter. The cutter 10 of Fig. 3 sweeps out lengthwise tooth surfaces which have a lengthwise radius of curvature equal to radius 26 minus distance 22—24, point 24 being the center of lengthwise curvature of the cutting surface and of the longitudinally concave tooth surface produced by the cutter. In similar manner, the inside cutting surface of the cutter sweeps out a tooth surface whose lengthwise curvature equals profile radius 27 plus distance 23—25, point 25 being the center of lengthwise curvature of the longitudinally convex tooth surface swept out by inside cutting profile 21.

It will be seen that the radius $r$ of lengthwise curvature of the cutter is larger for the outside cutting surface than for the inside cutting surface. The difference decreases with increasing point-width. Thus, the cutter 30 of Fig. 1 gives more ease-off at the outer and inner ends of the tooth surface and produces a shorter lengthwise tooth bearing than do the cutters shown in Figs. 2 and 3.

A further feature of my system of cutters is the control of lengthwise tooth bearing by shimming the cutter blades. This applies, of course, only where the cutter has separate outside and inside cutting blades, as has the cutter of Fig. 4. In such case, the cutting point-width 31, 41 or 51 can be changed by adjusting the outside and inside blades radially toward or away from one another. Thus, if it is found that a cutter of the point-width 41 shown in Fig. 2, produces in a pair of mating gears lengthwise tooth bearings or contacts on meshing tooth surfaces that are too short, the tooth bearings can be lengthened by using the cutter 10 of Fig. 3 after shimming its blades to reduce its cutting point-width 51 to the point-width 41 of the cutter of Fig. 2. This result is due to the different proportions of the radii of the cutting surfaces used on cutters of different point-width in my system of cutters.

Figure 6:
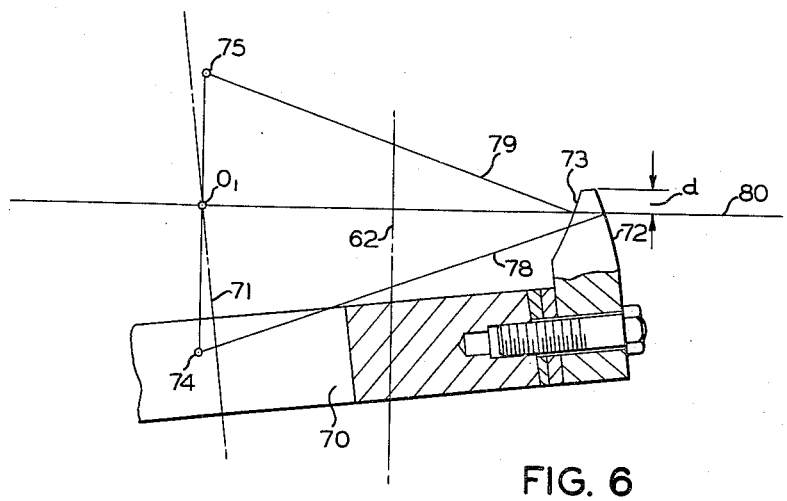
Fig. 6 is a fragmentary axial sectional view of a cutter such as may be used in the generation of the pinion of Fig. 5 and illustrating diagrammatically certain relationships between the cutter and the work.

Figs. 5 and 6 illustrate diagrammatically how the cutters of the present invention may be used in the generation of a pair of gears from basic crown gears or nominal crown gears. 60 denotes the basic gear fragmentarily and 61 is a tooth of this gear, that is a tooth, such as will be described by a cutter 70 made according to this invention.

The view of Fig. 5 is a section perpendicular to the axis 62 of the crown gear taken mid-way the height of the teeth of the crown gear. A pinion blank, which is to be cut, is denoted in dotted lines at 65. 66 designates the axis of the pinion and 67 its apex. The apex lies on the basic gear axis 62. The axis 71 of the cutter intersects the plane of Fig. 5 at point $O_1$, which has a position on the cutter axis corresponding to the point O of Fig. 3. P is a mean point along the length of the tooth 61.

Fig. 6 is a normal section taken along the line $PO_1$ of Fig. 5 and containing the cutter axis 71. The centers of the outside and inside cutting surfaces of the cutter are at 74 and 75, respectively, according to the principles herein laid down. For cutting a gear according to the method of this invention, the cutter is so positioned that the normals 78 and 79 to the outside and inside cutting surfaces 72 and 73, respectively, of the cutter are equally inclined to the pitch plane 80 of the crown gear, which is the plane of Fig. 5.

With my system of cutters, the tooth depth of the gear to be cut depends on the normal pitch. A cutter of given point-width then has to cut the same average dedendum $d$ (Fig. 6) and the same depth regardless of the tooth combination, at least if the gears have full depth teeth and are designed for a given point-width cutter. The cutter position in the normal plane can therefore readily be tabulated for the whole list of cutters. The gear or pinion to be cut may be generated according to conventional practice by rotating the cutter on its axis 71 while rolling cutter and work relative to one another as though the work were meshing with the basic generating gear, as, for instance, by rotating the work on its axis 66 while effecting relative swing of cutter and work about the axis 62 of the basic gear.

Figure 7:
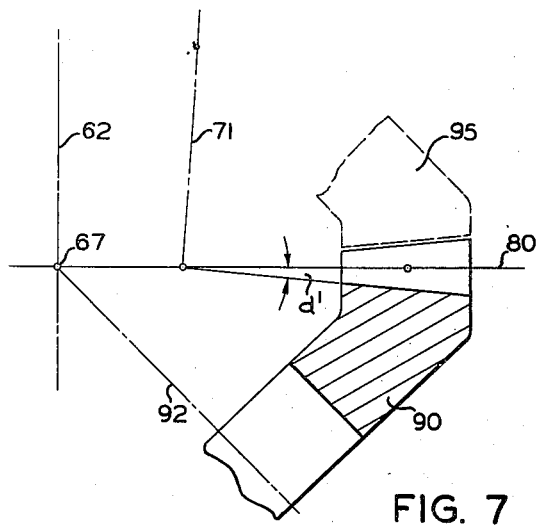
Fig. 7 is a fragmentary axial sectional view through the work axis and the axis of the basic generating gear, illustrating diagrammatically certain relationships between the work and the basic gear in generation of one member of a gear pair according to this invention when both members of the pair have equal tooth dedenda.
Figure 8:
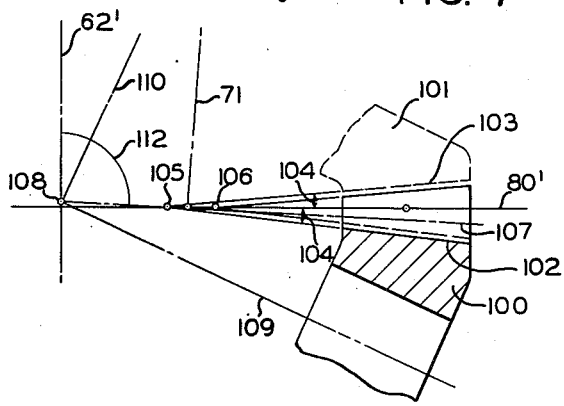
Fig. 8 is a corresponding view showing the relationships that exist between the work and the basic generating gear in the generation of the pinion or smaller member of a gear pair which have unequal dedenda.
Figure 9:
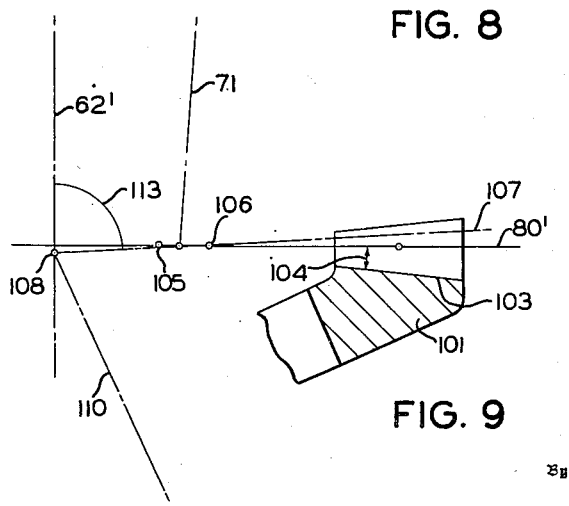
Fig. 9 is a diagrammatic view illustrating the relationship of the work and basic gear in the generation of the gear or larger member of this latter pair.

Figs. 7 to 9 are axial sections taken through the work axis and the axis of the crown gear and showing the generation of other gears by the system of the present invention. Fig. 7 illustrates the cutting of a mitre gear 90 whose mate is the pinion 95. Plane 80 is again the pitch plane of the basic crown gear represented by the cutter, which may be the same cutter 70 as used in cutting pinion 65. Here the dedendum angle $d'$ is assumed to be equal on both members of the gear pair as determined from the requirement that the spiral angle be the same on both sides 63 and 64 of the teeth 61 of the crown gear. The computation of the dedendum angle is known in the art. 67 is the gear apex and 71 denotes the position of the cutter axis in projection.

For cutting the two members of the pair, preferably the same cutter is used. For reasons of symmetry with respect to plane 80, the inclination of the cutter axis 71 to said plane and to the axis 62 of the basic crown gear or cradle is made the same in cutting both members of the gear pair. The distance of the cutter axis from the axis of the crown gear or cradle is also the same on both members, and so is the position of the cutter lengthwise of the cradle axis. A minimum of time is, therefore, required to set the gear cutting machine over from cutting one member of the gear pair to the other. Also, if there is a slight difference in the distance of the cradle axis from the cutter axis as compared with a specified computed value, this difference exists on both members so that one difference compensates the other.

It is known that a pair of bevel gears are conjugate to each other when they are conjugate to the two members, respectively, of a pair of complementary basic gears whose axis passes through the apex of said pair of bevel gears. These complementary basic gears have ratios such as to roll on the pitch cones of said bevel gears. The basic crown gear represented by the cutter and having its axis at 62 which is used in the generation of gear 90 and the basic crown gear used in the generation of the mating gear 95 are symmetrical with respect to pitch plane 80. The crown gears are exactly complementary when the teeth have full lengthwise tooth bearing. They can still be called complementary when less than full length tooth bearing is built into the cutters. Thus, with the present invention gears 95 and 90 can be generated conjugate to one another and with the same cutter 70.

With the present invention these outstanding advantages are retained, also, in cutting gears which have unequal dedenda. A similar pair of basic gears is used. This is illustrated in Figs. 8 and 9, which show, respectively, the generation of a pinion 100 and of a mating gear 101. The two complementary basic gears are symmetrical with respect to plane 80'. Thus, the root line 102 of the pinion 100 is inclined at the same angle 104 to the plane 80' as the root line 103 of the mating gear 101. The two root lines 102 and 103 intersect at a point 105; the face lines of the two gears intersect at point 106. A long tooth addendum is obtained on pinion 100 by inclining its pitch line element 107 to the plane of symmetry 80'. Preferably the pitch line element 107 is made to pass through point 106. It intersects the axis 62' of the basic gear at the apex or cone center 108. 109 denotes the axis of the pinion 100 and 110 the axis of the gear 101. Note that their common apex 108 is off-set from the plane of symmetry 80'.

In generation of either member of the pair, the cutter is rotated on its axis 71 in engagement with the work while a relative rolling movement is produced between the cutter and work about the axis of the basic gear. In this rolling movement, the cutter represents, as usual, a tooth of the basic gear. The rolling movement may be effected by rotation of the work on its axis 109 or 110 while the cutter is swung relative to the work about the axis 62' of the basic gear. In generation, the pitch cone of the pinion 100 rolls on the pitch surface of the basic gear, which is a cone obtainable by rotating element 107 about axis 62'. Its pitch angle 112 is larger than a right angle by the difference between the average dedendum angle 104 and the dedendum angle of the pinion. This difference is the dedendum angle increment of the gear. Angle 112 is a right angle plus the dedendum angle increment. Pitch angle 113 of the complementary basic gear used in the generation of the gear 101 (Fig. 9) is a right angle minus the dedendum angle increment.

The two gears of any gear pair 100 and 101 having unequal dedenda may be cut with the same cutter with a minimum of effort. The set-up of the cutter in the cradle is much like the set-up of Fig. 7 and much of it can be tabulated. The set-over from one member of the pair to the other is simple and requires no change in the cutter tilt and no change in the radial distance of the cutter axis from the axis 62' of the cradle. The two basic gears thus used, with their plane of symmetry 80', solve perfectly the problem of conjugacy of the gears 100 and 101.

The present invention is applicable not only where both members of a gear pair are generated but also to the cutting of the generated member of a gear pair where the other member is form-cut or non-generated. In this latter case, the pinion is generated conjugate to the form-cut gear by providing a cutter which describes a gear tooth and by rolling the gear represented by the cutter with the pinion blank.

Figure 10:
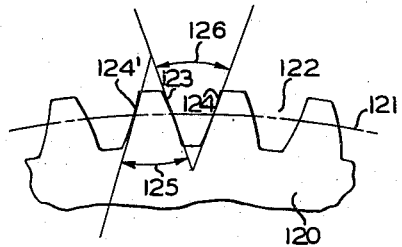
Fig. 10 is a diagrammatic view showing certain aspects of the structure of a non-generated gear.

Fig. 10 can be considered a normal section through a form-cut gear 120. The pitch circle of this gear is indicated at 121. Its tooth spaces 122 are cut as counterparts of the cutting surfaces of the cutter. Thus the sides 123 and 124 of the gear teeth are essentially portions of convex and concave spherical surfaces, respectively.

If one side 124 of a tooth is turned about the axis of the gear 120 through the angle of a normal pitch of the gear, the corresponding side 124' of the next tooth may be obtained. Side 124' has less inclination to side 123 than side 124, the included angle 125 between opposite sides 123 and 124' of a gear tooth being less than the included angle 126 between opposite sides of a tooth space on form-cut gears. In the known procedure, the cutter which cuts the pinion and which describes the tooth of the gear has, therefore, a smaller included angle 125 between its opposite side-cutting edges than the gear cutter which describes a tooth space of the gear. While gear cutters may be made standard, as in conventional practice, a great variety of pinion cutters is therefore required.

Figure 11:
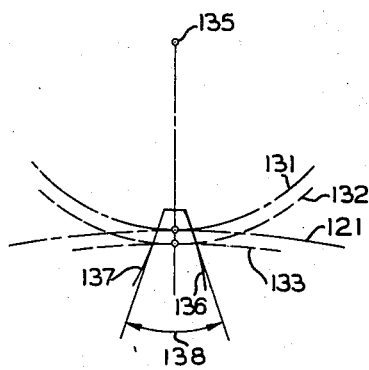
Fig. 11 is a diagrammatic view illustrating how the present invention may be employed in the production of the mating pinion.

The present invention permits use of a reduced number of pinion cutters. With the present invention, either the same cutter may be used on both gear and pinion or cutters with the same included angle. The included angle of the pinion cutter is then larger than the angle between opposite sides of the teeth of the non-generated gear. This difference is made up in the generation of the pinion. Instead of rolling the pinion on its pitch circle 131 (Fig. 11) it is rolled on a larger circle 132, and the pinion blank and cutter are rolled on this larger circle 132 as though the pinion were rolling with a gear whose pitch circle is at 133 concentric with the axis of the gear but inside the pitch circle 121 of the gear. In practice, this means reducing the ratio of roll below the ratio of the tooth numbers of gear and pinion. On spiral bevel or hypoid pinions, a slight change of spiral angle is also required. The changes can be computed or determined experimentally in the shop. In view of the small changes involved it is not difficult to find what they are by trial. In this manner a substantial saving in cutter equipment is achieved and the right cutters are always on hand.

134 is the axis of the gear, and 135 is the axis of the pinion. 136 and 137 denote, respectively, the profiles of opposite side-cutting surfaces of the cutter used in generation of the pinion. The included angle between these opposite side-cutting surfaces is denoted at 138 and is equal to the included angle 126 between the opposite sides of a tooth space of the gear, that is, to the included angle between the opposite side-cutting surfaces of the gear cutter.

While the invention has been described in connection with certain particular embodiments thereof and in connection with certain uses therefor, it will be understood that it is capable of further modification, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter having outside and inside cutting surfaces that are of curved profile shape in a plane axial of the cutter and that have different radii of profile curvature, the centers of profile curvature of said surfaces being off-set from the axis of the cutter and the amounts of off-set of said centers being proportional to the radii of profile curvature of the respective surfaces.

2. A face-mill gear cutter having outside and inside cutting surfaces that are of convex and concave circular arcuate profile shape, respectively, in a plane axial of the cutter and that have different radii of profile curvature, the centers of profile curvature of said surfaces being off-set at opposite sides of the axis of the cutter and the amounts of off-set of said centers being proportional to the radii of the respective surfaces.

3. A face-mill gear cutter having outside and inside cutting surfaces that are of convex and concave circular arcuate profile shape, respectively, in a plane axial of the cutter and that have different radii of profile curvature, the centers of profile curvature of said surfaces being off-set at opposite sides of the axis of the cutter so that a line drawn through said centers is inclined to and intersects said axis, and said cutting surfaces being equally inclined to any line drawn through the point of intersection of the line of centers with said axis.

4. A face-mill gear cutter having outside and inside cutting surfaces that are inclined to the cutter axis and that are of curved profile shape in a plane axial of the cutter and that have different radii of profile curvature, the centers of profile curvature of said surfaces being offset from the axis of the cutter, the radius of profile curvature of the outside cutting surface being larger than the radius of profile curvature of a spherical surface which is centered on the cutter axis and is at the same distance from and is of the same inclination to the cutter axis, the radius of profile curvature of the inside cutting surface being smaller than the radius of profile curvature of a spherical surface which is centered on the cutter axis and is at the same distance from and is of the same inclination to the cutter axis, and the amounts of offset of said centers being proportional to the radii of profile curvature of the respective surfaces.

5. A rotary face-mill gear cutter having outside and inside cutting blades that are adjustable radially of the cutter axis, said blades having outside and inside cutting edges that lie, respectively, in cutting surfaces that are, respectively, of convex and concave circular arcuate profile shape in a plane axial of the cutter, and that have different radii of profile curvature, respectively, the centers of profile curvature of said surfaces being offset, respectively, at opposite sides of the axis of the cutter and the amounts of offset of said centers being proportional to the radii of the respective surfaces in one position of radial adjustment of the blades.

6. A rotary face mill gear cutter having outside and inside cutting surfaces that are of convex and concave circular arcuate profile shape, respectively, in a plane axial of the cutter, and that have different radii of profile curvature, the centers of profile curvature of said surfaces being offset at opposite sides of the axis of the cutter so that a line drawn through said centers is inclined to and intersects said axis, and said cutting surfaces being equally inclined to any line drawn through the point of intersection of the line of centers with said axis, the outside cutting surface having a greater radius than the inside cutting surface.

ERNEST WILDHABER.

References Cited in the file of this patent

UNITED STATES PATENTS

| Number | Name | Date |
|---|---|---|
| 1,364,056 | Farnum | Dec. 28, 1920 |
| 1,654,199 | Wildhaber | Dec. 27, 1921 |
| 1,655,080 | Wildhaber | Jan. 3, 1928 |
| 1,973,135 | Adams | Sept. 11, 1934 |
| 2,114,793 | Bauersfeld | Apr. 19, 1938 |
| 2,346,806 | Wildhaber | Apr. 18, 1944 |
| 2,346,807 | Wildhaber | Apr. 18, 1944 |
| 2,353,768 | Shlesinger | July 18, 1944 |

FOREIGN PATENTS

| Number | Country | Date |
|---|---|---|
| 546,494 | Great Britain | July 16, 1942 |